Figure 1:
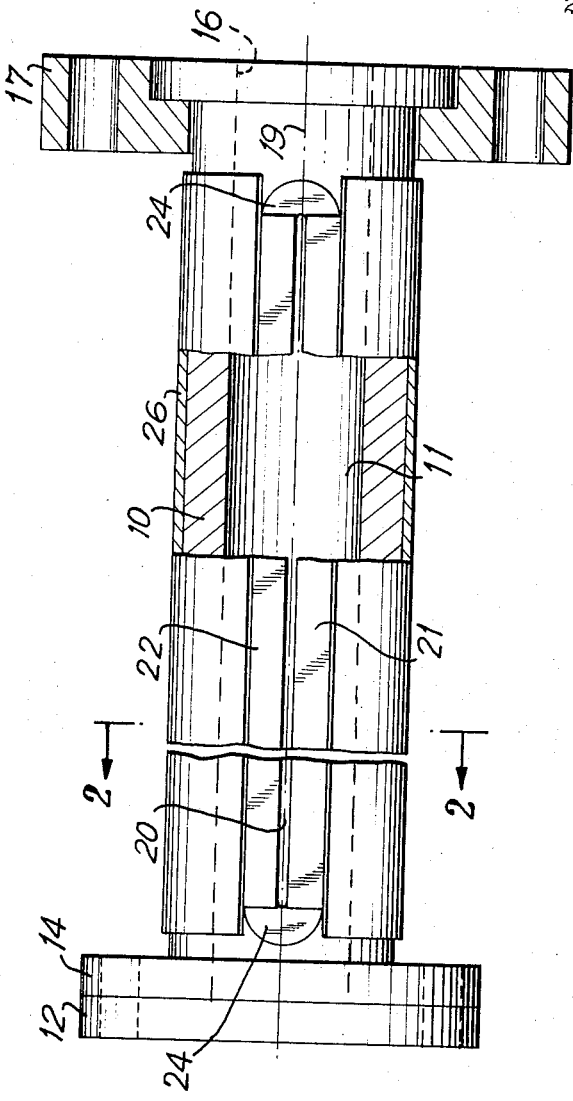

Nov. 28, 1967  W. SIMON  3,354,505
EXTRUSION DIE
Filed May 14, 1965  2 Sheets-Sheet 1

INVENTOR
WILHELM SIMON
BY
Curtis, Morris + Safford
ATTORNEYS

Nov. 28, 1967 — W. SIMON — 3,354,505
EXTRUSION DIE
Filed May 14, 1965 — 2 Sheets-Sheet 2

INVENTOR.
WILHELM SIMON
ATTORNEYS

United States Patent Office 3,354,505
Patented Nov. 28, 1967

3,354,505
EXTRUSION DIE
Wilhelm Simon, Seeheim, Bergstrasse, Germany, assignor to Rohm & Haas G.m.b.H., Darmstadt, Germany
Filed May 14, 1965, Ser. No. 455,697
Claims priority, application Germany, May 14, 1964, R 37,897
4 Claims. (Cl. 18—12)

This invention relates to a novel extrusion die for extruding thermoplastic materials in the form of sheets and films.

It is well known that sheets and films of thermoplastic, synthetic materials are formed by means of extrusion presses and the like. With continuous working in screw conveyors, the material is compacted, deaerated, plastified, fed to and extruded through a fishtail die and the sheet or film, which leaves in a heated, highly elastic condition, is passed to a series of rollers on which it becomes rigid on cooling.

The structure of such dies must be adapted to the particular melt viscosity of the material to be extruded since the flowability of various materials varies considerably. The pressure that prevails in an extrusion die head should, if possible, diminish uniformly as the material passes from the interior to the exterior.

With fishtail dies, the material is fed to the mid-portion and distributed to the two sides. To avoid faster flow to the middle than to the sides and to obtain uniform distribution of the pressure throughout the length of the nozzle or slot of the die, a baffle plate may be used which is less effective at the ends than at the middle in impeding the flow of material. Temperature control in the die head is of critical importance; pains are taken to achieve uniform heating of the material by appropriate heating of the mouth of the die and the interior of the distributor head or baffle plate support. The mouth of the nozzle generally consists of a fixed lip and a movable lip whose distance from the fixed lip can be adjusted by means of a number of adjusting screws.

Numerous structural modifications, which serve primarily for the control of the temperature, the building up of the pressure and the distribution of the pressure and thus the uniformity of the flow of the material over the entire width of the die, have heretofore been suggested. However, it is common to all known embodiments of such dies that the material is forced out of the slot in the same direction as the direction in which the material is fed to the extrusion head.

The present invention relates to a slotted extrusion die which is unique in the simplicity of its construction and which makes possible the production of sheets and films of large width, e.g., of the order of 3000 mm. and more.

In contradistinction to the development of the previously known extrusion dies, the apparatus of the invention consists, in its simplest embodiment, of a tubular member forming a chamber which has a length corresponding to the width of the sheets or films to be produced. It is adapted to be heated externally and is arranged to be secured substantially coaxially to a screw conveyor or other feed mechanism for delivering plasticized material under pressure. The wall of the tubular member has a longitudinal slot. Means are provided to secure the die firmly to the feed mechanism. The plasticized material enters the heated die and first of all fills it to build up pressure which is substantially uniform throughout the chamber. When such pressure has been built up, the closed end of the chamber directs the material, which is in a plastic state, to emerge uniformly from the slot in the die in a direction perpendicular to the longitudinal axis. The film or sheet that is thus shaped and extruded is removed in customary manner by a conveyor device.

Figure 2:
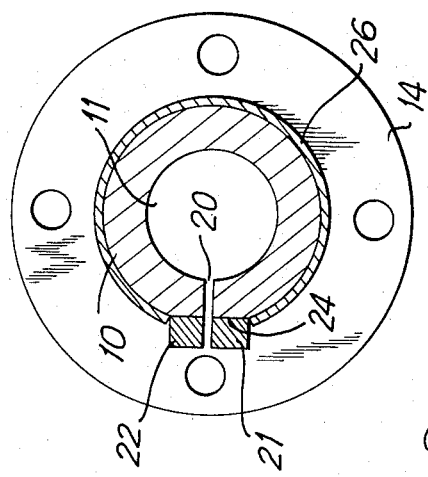
Figure 3:
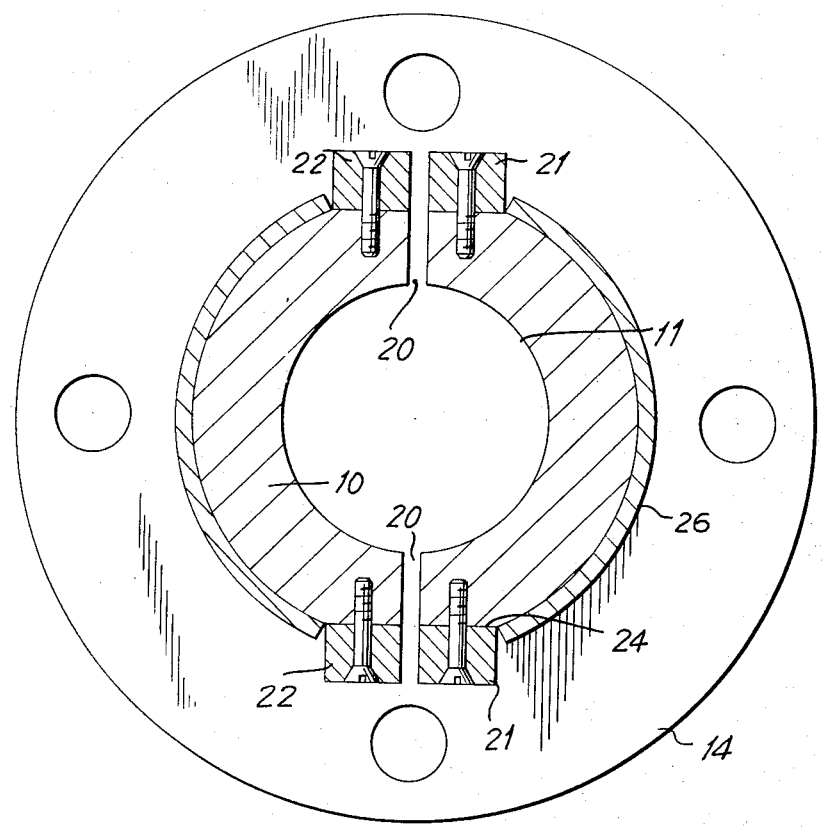

The essential features of a preferred embodiment of the invention are illustrated by way of example in the accompanying drawings wherein:

FIGURE 1 is a view in elevation, partially in section;
FIGURE 2 is an end view taken on section line 2—2 of FIGURE 1; and
FIGURE 3 is an end view taken on a section line, such as 2—2 of FIGURE 1, of a die wherein the tubular member is provided with two longitudinal slots.

The die illustrated in the drawing of FIGURES 1 and 2 includes a thick walled tubular member 10 forming an elongated tubular chamber 11 one end of which is closed by suitable means such as flanges 12 and 14 and the other end of which is open as shown at 16. The open end 16 is provided with a flange 17 adapted to be secured to a feed mechanism, not shown, for thermoplastic material, the longitudinal axis 19 of the chamber 11 being in substantial alignment with the direction of flow of material from the feed mechanism.

A longitudinal slot 20 is cut in the wall of the tubular member 10 and two lip members 21, 22 are seated on and secured to a milled surface 24. Means are provided for heating the die, e.g., by heating elements around the tubular member 10 as shown schematically at 26. Heating elements, not shown, may also be provided for the flanges and suitable means may be provided for controlling the temperature of each heating element.

In operation, the die is secured to a feed mechanism such as a screw conveyor by means of flange 17, the heating elements are activated and the thermoplastic material is forced axially into the chamber 11. When the chamber is filled, the flange 12 prevents further axial movement of the material through the chamber and pressure builds up to direct the material through the slot 20 in a direction substantially perpendicular to the longitudinal axis 19 and between lip members 21 and 22 to form a smooth surfaced sheet or film of thermoplastic material for delivery to suitable conveyor means, not shown.

Similarly, the die illustrated in the drawing of FIGURE 3 includes a thick walled tubular member 10 forming an elongated tubular chamber 11, one end of which is closed by suitable means, such as flanges 12 and 14 depicted in FIGURE 1, and the other end of which is open as shown at 16 of FIGURE 1. Two longitudinal slots 20 are cut in the wall of the tubular member 10, and two lip members 21 and 22 on one side and 21 and 22 on the other and opposite side are fitted on and secured to a milled surface 24. Similarly to a single slot die means are provided for heating the die, e.g., by heating channels around the tubular member 10 as shown schematically at 26. The two slots allow for simultaneously extruding thermoplastic material in directions substantially perpendicular to the longitudinal axis.

It is to be understood that the structure of the new die is such as to be capable of taking up, without any deformation, the pressure exerted upon the extruding material. This pressure, as is known varies considerably as a function of the material to be extruded and is, for instance, between about 50 kg./cm.$^2$ for plasticized polyvinyl chloride and 300 kg./cm.$^2$ for polystyrene.

The new apparatus of the invention makes internal heating unnecessary. Ordinary external heating with temperature measuring and control devices is sufficient.

The simplicity of the construction of the extrusion die in accordance with the invention makes it generally advisable to use a separate die for each desired thickness of sheet or film, i.e., to dispense with adjustability of the die lips. This obviates the non-uniformity of thickness of extruded product which is not completely avoidable with an adjustable outlet slot even when a large number of adjusting screws is provided.

The dimensions of the die, i.e., the diameter of the chamber, should be in a suitable ratio to the width of the longitudinal slot. For example, for the manufacture of a polymethylmethacrylate sheet having a thickness of 3 mm., it has proven suitable to use a chamber having an inside diameter of 50 mm. and a wall thickness of 33 mm.

In the extrusion of sheets or films, the die in accordance with the invention can be modified so that it is provided with a slot on each side, thus to make possible the simultaneous production of two sheets or films. In this case, the halves of the tubular member, in order to assure sufficient resistance to deformation, must be held together in a suitable manner, for instance, by retaining collars. External heating can in this instance not be effected by elements which surround the tube substantially completely, but rather heating elements must be arranged longitudinally of the die.

The new device can be manufactured considerably more cheaply than the dies heretofore customary. Due to the comparatively small mass of the die, the time of heating is considerably shorter than in the case of the known dies. The temperature can, therefore, be regulated rapidly in the case of the device of the invention. While in the traditional dies it requires about 20–30 minutes to effect a change in temperature, by which time about 7 to 10 meters of material may have been extruded, in the new die an adjustment of temperature is effective within about three minutes, i.e., after an extrusion of about one meter of material.

It must, furthermore, be deemed surprising that the pulsation inherent in the operation of the feed mechanism is not transmitted to the extruded material but is absorbed practically completely by the mass of plastic material present in the chamber; the sheets and films produced in this manner are, therefore, characterized by a practically entirely smooth surface and are "optically quiescent." It should, furthermore, be emphasized that for the same materials, the operating temperature can be 20 to 30° C. less than the temperature necessary when using the previously known fishtail dies. The surface of the extruded material nevertheless has a high luster.

It is to be expected that various alterations and modifications will suggest themselves to those skilled in the art upon reading this description. All such alterations and modifications are intended to be included within the scope of the following claims.

I claim:
1. Extrusion die for thermoplastic material delivered under pressure from a feed mechanism, said die consisting of a walled tubular member of uniform thickness, concentric and circular in cross-section adapted to be heated externally and having a longitudinal axis, an open end adapted to be secured to the feed mechanism for receiving material delivered therefrom, a tubular chamber having a clear unobstructed passage for distributing said material along the length thereof, a longitudinal slot in the wall of the tubular member providing an elongated passageway from the chamber to the exterior of the die, and a closed end for directing the thermoplastic material through the slot in a direction substantially perpendicular to said longitudinal axis to extrude said material.

2. Extrusion die as defined in claim 1, wherein the tubular member is provided with two longitudinal slots for simultaneously extruding thermoplastic material in directions substantially perpendicular to the longitudinal axis.

3. Extrusion die as defined in claim 1, wherein the longitudinal slot is formed at least in part by two elongated lip members detachably secured to the exterior of the tubular member.

4. The extrusion die defined in claim 1 wherein the tubular member has an inside diameter of 55 millimeters and a wall thickness of 33 millimeters.

References Cited
UNITED STATES PATENTS

| | | | |
|---|---|---|---|
| 2,982,995 | 5/1961 | Groleau | 18—12 |
| 3,084,385 | 4/1963 | Heffelfinger | 18—12 |
| 3,155,540 | 11/1964 | Loeffler et al. | 18—12 X |
| 3,187,390 | 6/1965 | Frankel et al. | 18—12 |

FOREIGN PATENTS

| | | |
|---|---|---|
| 644,476 | 7/1962 | Canada. |

WILLIAM J. STEPHENSON, *Primary Examiner.*

J. SPENCER OVERHOLSER, *Examiner.*